United States Patent [19]
Ehrlich et al.

[11] 3,852,685
[45] Dec. 3, 1974

[54] HEATING MEANS FOR METAL VAPOR LASERS

[75] Inventors: John J. Ehrlich; Pasquale Martignoni, both of Huntsville, Ala.

[73] Assignee: The United States of America as represented by the Secretary of the Army, Washington, D.C.

[22] Filed: July 27, 1973

[21] Appl. No.: 383,205

[52] U.S. Cl. ............. 331/94.5, 331/94.5 G, 330/4.3
[51] Int. Cl. ............................................. H01s 3/22
[58] Field of Search ................... 331/94.5; 330/4.3; 23/253 PC; 432/210, 213

[56] References Cited
UNITED STATES PATENTS
3,585,524   6/1971   Silfuast ............................ 331/94.5

OTHER PUBLICATIONS

Gould, Applied Optics, Supplement on Chem Lasers, 1965, pp. 59–67.

Howard, Jr. "Resonant Energy Transfer . . . . , a Gas Laser," U.S. Gov't Tech Report AD603680, 1964, pp. 22–47.

*Primary Examiner*—William L. Sikes
*Assistant Examiner*—R. J. Webster
*Attorney, Agent, or Firm*—Edward J. Kelly; Herbert Berl; Herbert H. Murray

[57] ABSTRACT

A metal vapor laser having the laser tube mounted in a gas fired furnace for raising the temperature to a point where the metal inside the tube vaporizes.

2 Claims, 1 Drawing Figure

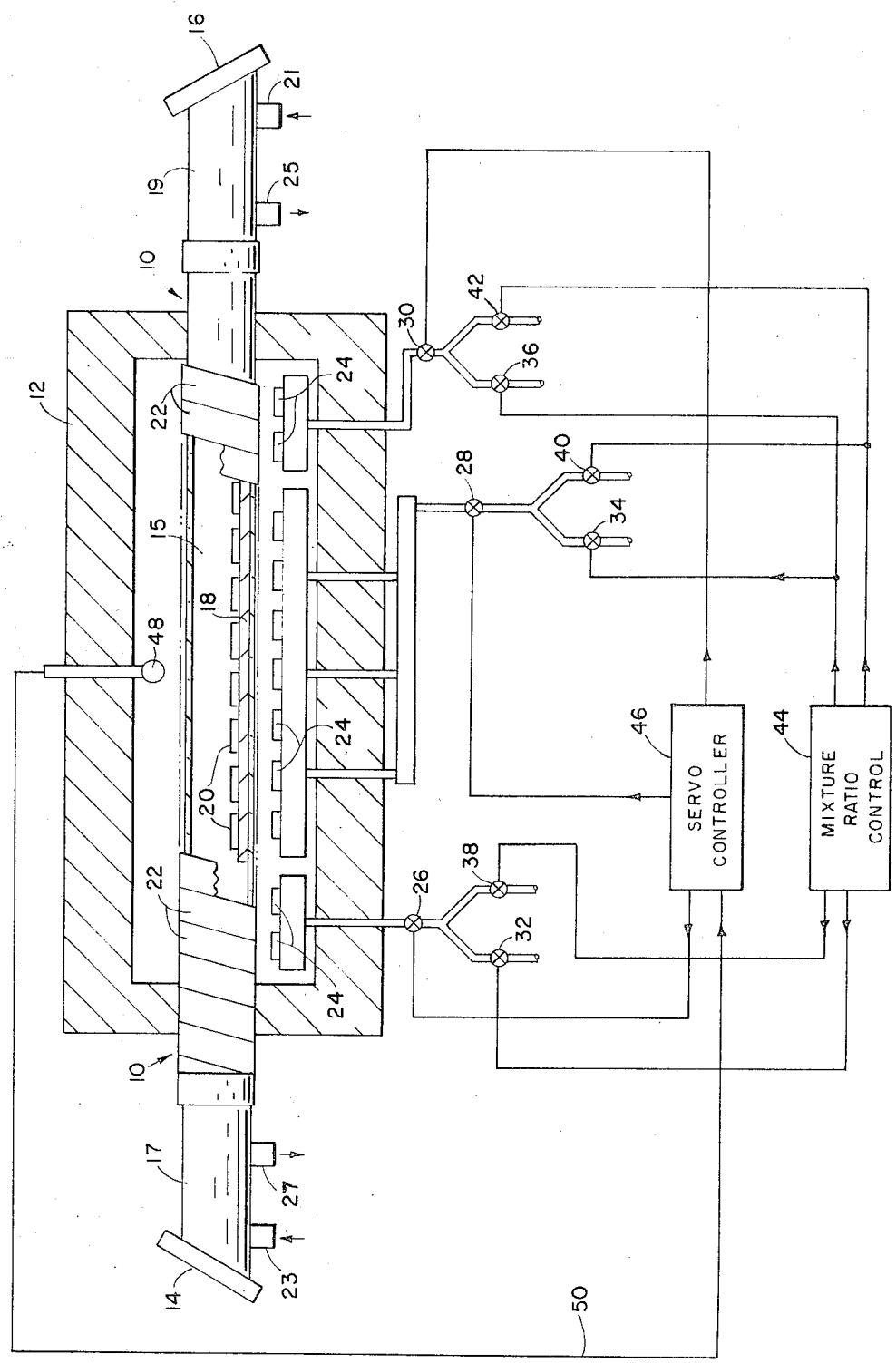

HEATING MEANS FOR METAL VAPOR LASERS

BACKGROUND OF THE INVENTION

Experiments have been conducted using metals having high vapor pressures at relatively low temperatures to investigate whether or not these vapors can be made to lase. In the experiments only gram amounts of metal were used and the vapor pressure was accomplished by heating the metals in electric furnaces whose operating temperatures were approximately 1,400° to 1,600°C. In order to make such a laser practical it would be necessary to vaporize metals in the kilogram quantities rather than in gram quantities. Such large amounts of metal require considerable electrical power thus making the resultant laser very bulky and not very susceptible to mobilization.

It is therefore an object of this invention to provide a means for heating the laser tube to vaporize the metal therein by means of a gas fired furnace which is more mobile than an electric furnace.

Another object of the invention is to provide a gas furnace for vaporizing the metal within the laser wherein a more accurate and sensitive control can be maintained over the heating elements.

BRIEF DESCRIPTION OF THE DRAWING

The single FIGURE of the drawing illustrates a furnace constructed in accordance with the principles of the invention plus, a supply of oxygen and acetylene to provide an oxyacetylene flame within the furnace for heating a laser tube extending therethrough to vaporize metallic copper within the laser tube.

DETAILED DESCRIPTION OF THE INVENTION

Referring now to the drawing, 10 indicates a three part laser tube. The central portion 15 of which is ceramic while the end portions 17 and 19 are metallic. The metallic end portions are closed by two transparent windows 14 and 16. A furnace structure 12 surrounds the ceramic central portion 15 of the laser tube 10.

Two inlet tubes 21 and 23 are connected one to the metallic section at each end of the tube 10 and two vacuum tubes 25 and 27 are connected to the metallic end sections at points spaced inwardly from the tubes 21 and 23. Helium is circulated in the metallic end portions of the tube entering through tubes 21 and 23 and exiting through tubes 25 and 27.

Resting within the laser tube is a sheet of tantalum (or other material which copper will wet) 18 and a plurality of scraps of solid copper 20 rest upon the tantalum sheet. The outer surface of portion of the laser tube 10 within the furnace is wrapped with a continuous thin metal foil 22 made of tantalum or similar material.

A plurality of burners 24 are mounted in the furnace 12. The burners may be of the type illustrated but could be of any type including ring burners. The gas flow to the burners is controlled by three flow control valves 26, 28 and 30 which control the volume of gas flowing to the burners 24. The mixture of gases is controlled by three oxygen valves 32, 34 and 36 and three acetylene valves 38, 40 and 42, respectively. The mixture valves are controlled by a mixture ratio control assembly 44 so that the mixture which passes through the flow control valves 26, 28 and 30 to the burners 24 is a stoichiometeric mixture. The volume passing through the flow control valves 26, 28 and 30 is controlled by a servo controller 46 which is responsive to a heat sensing device 48 mounted in the upper portion of the furnace 12 and connected to the servo controller by proper electrical connections 50.

In the use of the device the burners 24 are ignited and flow to the burners is controlled through the servo controller to heat the furnace relatively slowly while the heat is evenly distributed over the laser tube by means of the foil strip 22 to prevent thermal shock. The heat is continued till the temperature within furnace 12 reaches approximately 1,500°C. The temperature is then controlled by the heat sensor 48 to maintain a temperature of approximately 1,500°C. At approximately 1,100°C the copper chips 20 melt and since the liquid copper tends to wet the tantalum sheet 28, the liquid copper spreads out over the tantalum sheet providing a large surface area from which the vapor will emanate to provide a copper vapor atmosphere within the gas tube 10. The copper vapor is prevented from contacting and depositing on the transparent windows 14 and 16 by the helium being circulated in the end portions of the tube 10. Since the burner mixture is a stoichiometeric mixture, there is no free oxygen to oxidize the strip 22 which surrounds the gas tube 10. The strip 22 is electrically connected to one metallic end 17 of the tube 10 and performs a double function, that of evenly distributing the heat over the area of the gas tube within the furnace 12 and also acts as a coaxial ground conductor for the circuit within the laser structure. This permits discharge circuitry to produce sharper current pulses of very short rise time.

We claim:

1. In a metallic vapor gas laser, the combination comprising:
   a ceramic tube,
   metallic chips in said tube to be vaporized,
   a furnace structure surrounding said tube,
   a plurality of gas burners in the lower portion of said furnace,
   a supply of oxygen for said burners,
   a supply of fuel gas for said burners,
   means for individually controlling the flow of fuel gas and oxygen to said burners,
   a temperature sensing device in said furnace,
   means connecting said temperature sensing device to said flow control means to automatically control the temperature in said furnace,
   a metal plate located in said ceramic tube, said plate having a higher melting point than said metallic chips and being capable of being wetted by the molten metal of said chips, and
   a strip of tantalum foil spirally wound about the outer surface of said ceramic tube to distribute the heat evenly over said tube and to act as a coaxial ground path for the discharge current of said laser.

2. A metallic vapor gas laser as set forth in claim 1 wherein the metallic chips are copper and the metal plate is tantalum.

* * * * *